United States Patent [19]

Garter et al.

[11] Patent Number: 5,063,728
[45] Date of Patent: Nov. 12, 1991

[54] APPARATUS FOR MOUNTING A ROW UNIT FOR LATERAL MOVEMENT

[75] Inventors: Lee F. Garter, Western Springs; Michael J. Covington, LaGrange, both of Ill.

[73] Assignee: J. I. Case Company, Racine, Wis.

[21] Appl. No.: 621,322

[22] Filed: Dec. 3, 1990

[51] Int. Cl.$^5$ ............... A01D 46/08; A01D 67/00
[52] U.S. Cl. ............... 56/13.5; 56/28; 56/DIG. 9; 111/57; 172/656
[58] Field of Search ............... 56/13.5, 28, 30, 33-36, 56/6, DIG. 9; 172/654, 656, 645, 649

[56] References Cited

U.S. PATENT DOCUMENTS

| | | |
|---|---|---|
| 4,249,365 | 2/1981 | Hubbard et al. ............... 56/13.2 |
| 4,344,271 | 8/1982 | Schlueter et al. ............... 56/13.6 |
| 4,509,603 | 4/1985 | Adams ............... 172/656 X |
| 4,803,830 | 2/1989 | Junge et al. ............... 56/135 X |
| 4,815,259 | 3/1989 | Scott ............... 56/6 |
| 4,828,043 | 5/1989 | Karlsson ............... 172/656 |
| 4,896,492 | 1/1990 | Junge et al. ............... 56/13.5 X |

Primary Examiner—Stephen J. Novosad
Attorney, Agent, or Firm—Dressler, Goldsmith, Shore, Sutker & Milnamow, Ltd.

[57] ABSTRACT

An apparatus for mounting a row unit for lateral movement relative to a chassis of an agricultural implement. The row unit mounting apparatus includes a laterally extending tool bar assembly supported on a chassis and having a support surface extending between opposite ends thereof. The row unit is supported on the main frame in a manner allowing sliding movement of the row unit along the support surface of the tool bar assembly. The tool bar assembly includes a main frame and an extension frame selectively attachable to a first end of the main frame for easily and conveniently extending the support apparatus to provide additional row unit capacity or to accommodate lateral movement of the row units in a manner facilitating inspection and servicing thereof.

13 Claims, 5 Drawing Sheets

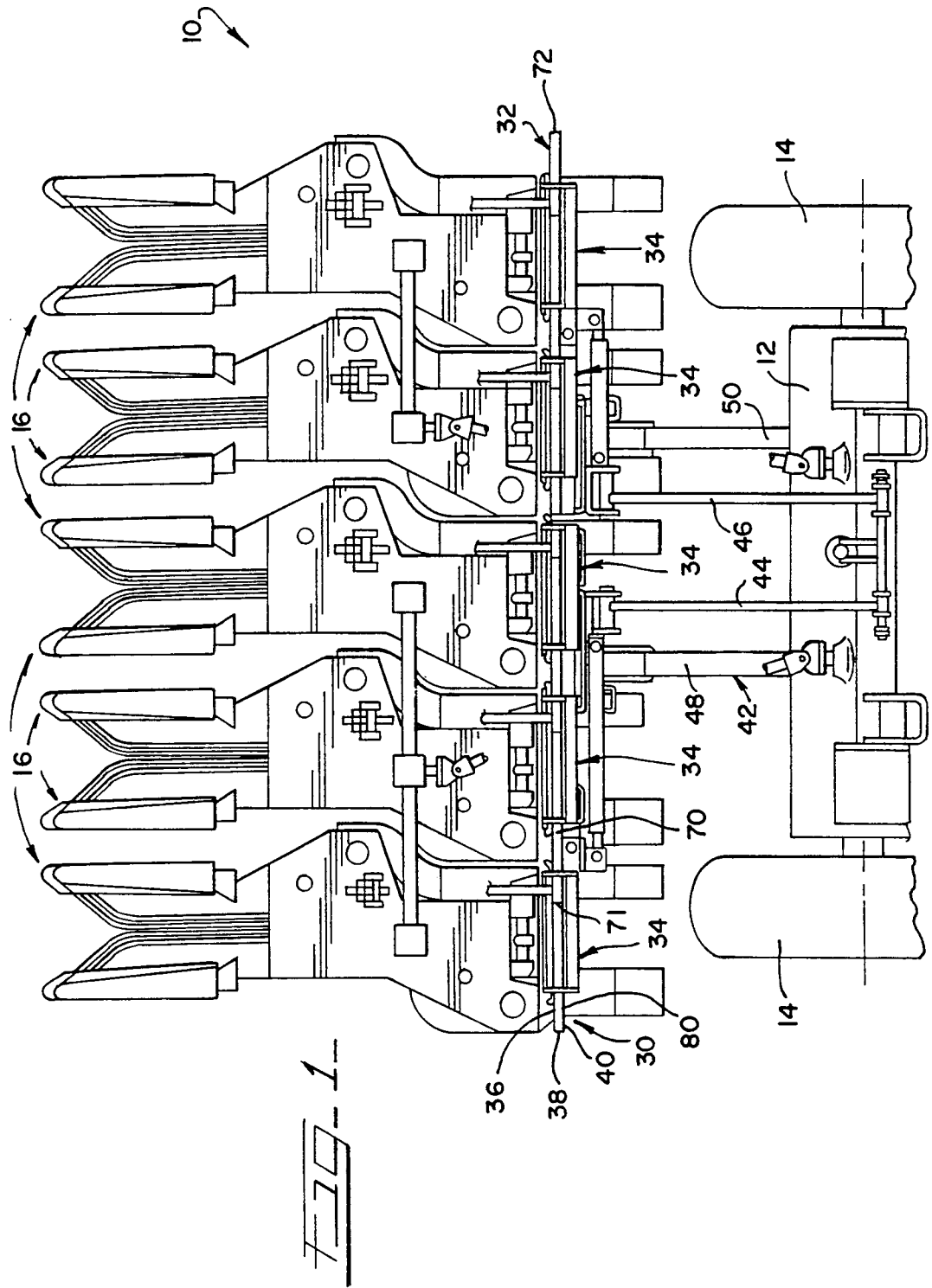

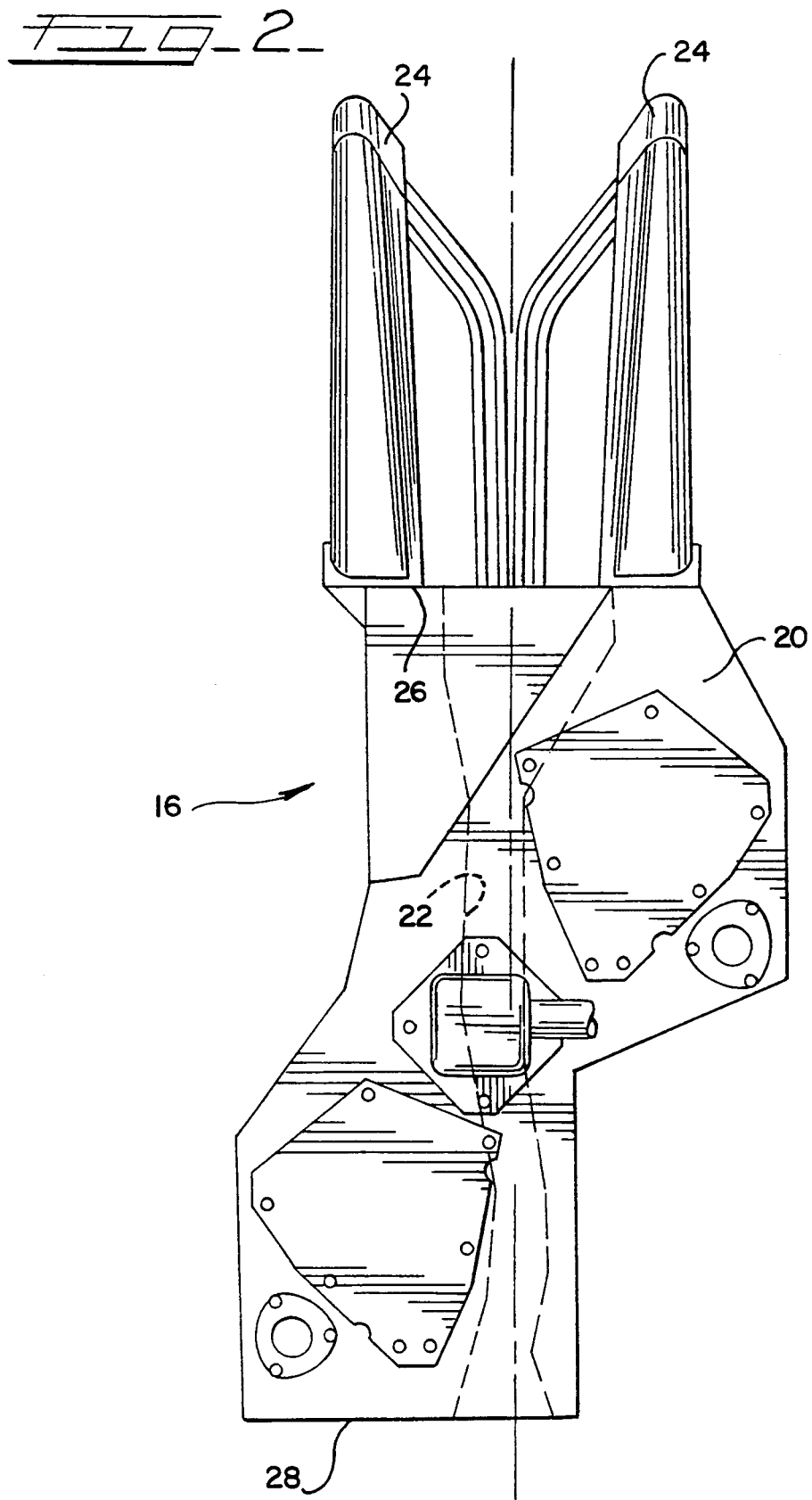

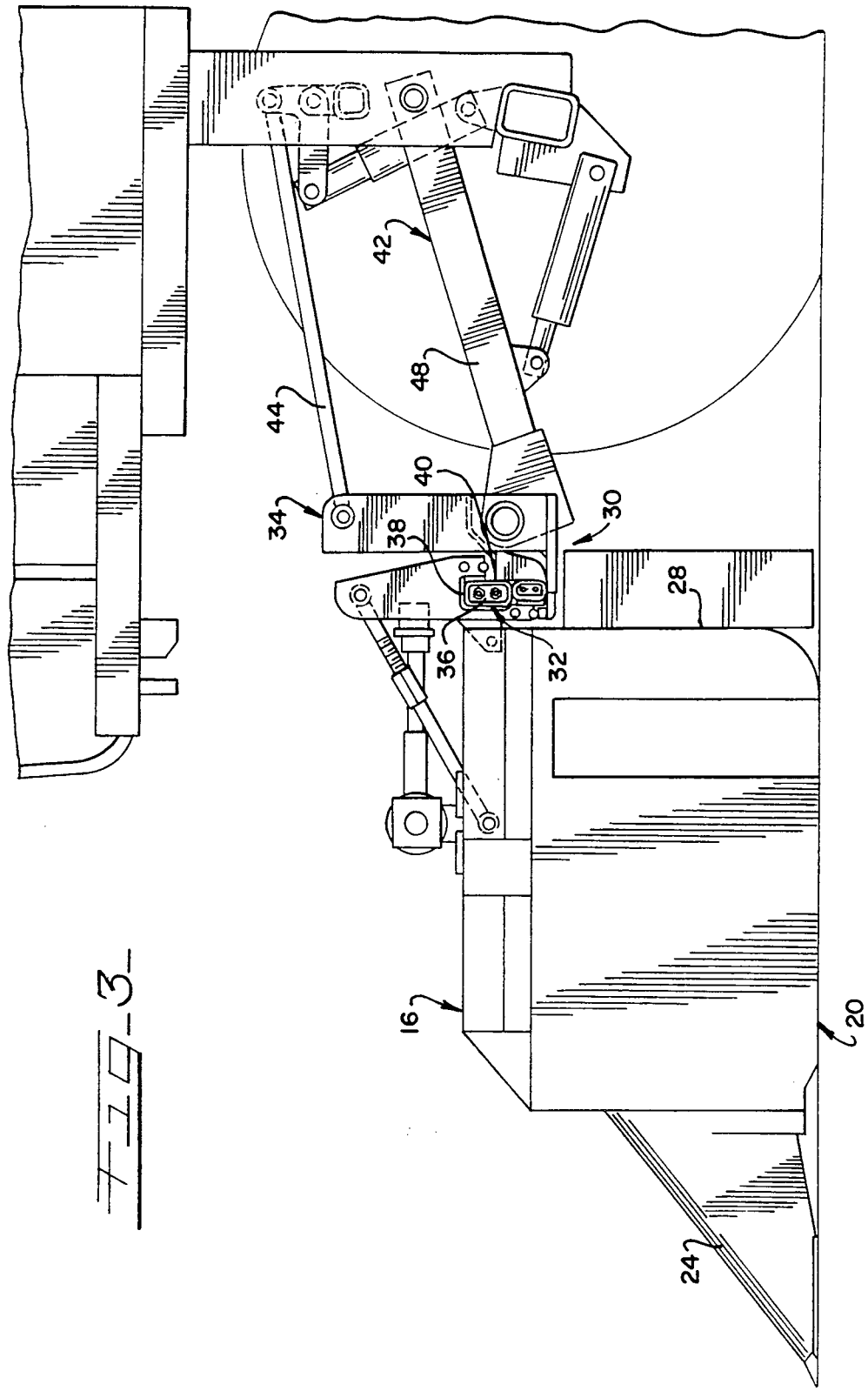

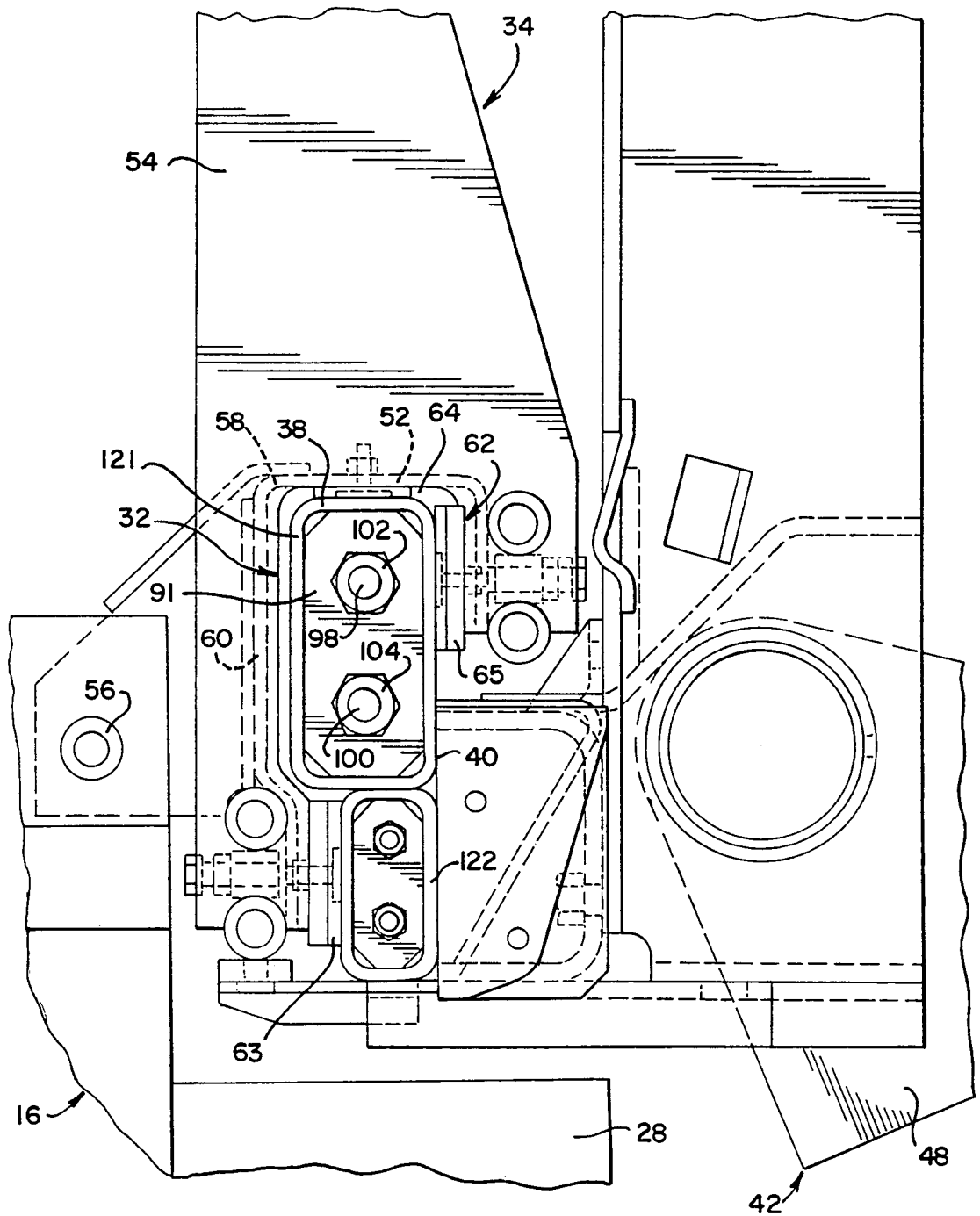

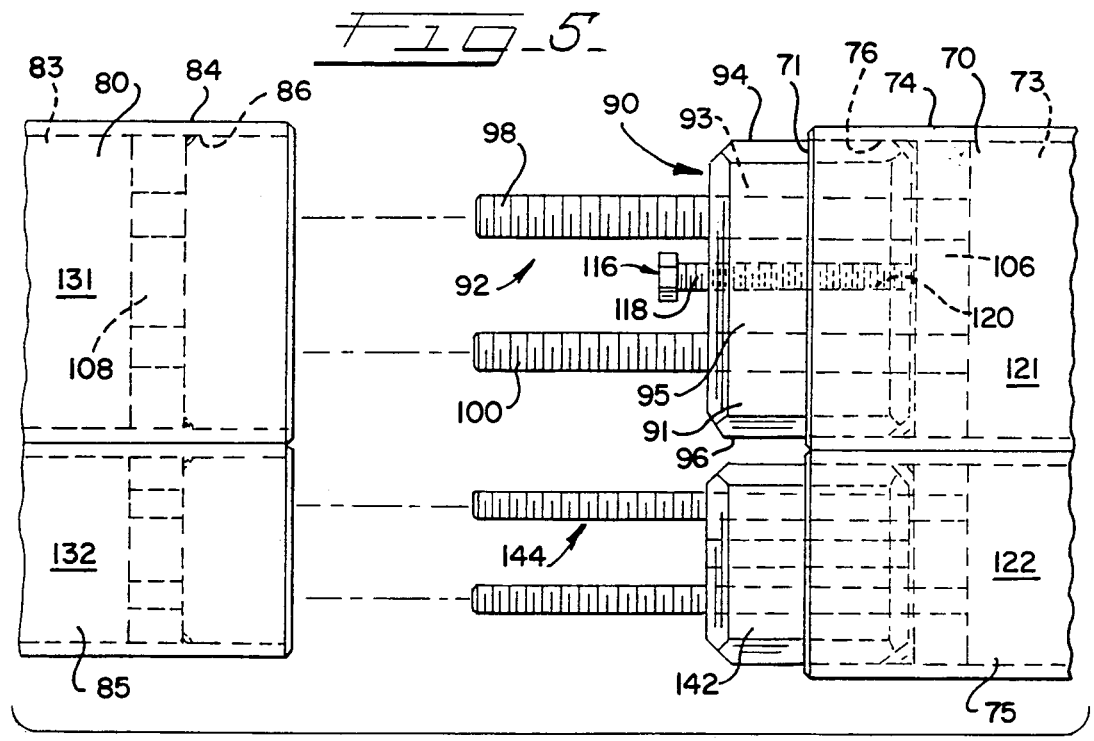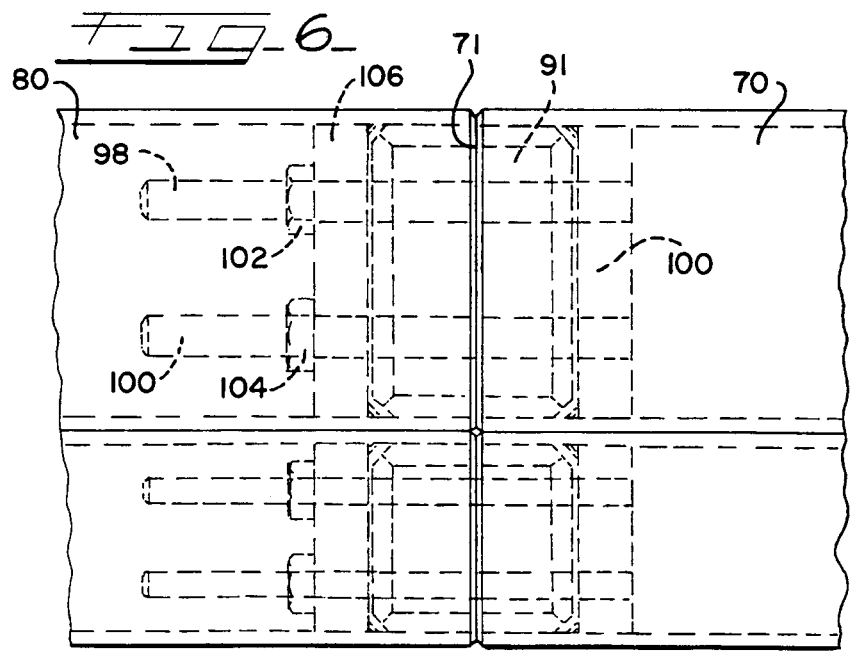

APPARATUS FOR MOUNTING A ROW UNIT FOR LATERAL MOVEMENT

FIELD OF THE INVENTION

The present invention generally relates to an agricultural implement and, more particularly, to an apparatus for mounting one or more row units on an agricultural implement in a manner facilitating lateral movement of the row units relative to the implement.

BACKGROUND OF THE INVENTION

Farmers are continually trying different spacings between adjacent crop rows to maximize productivity. Accordingly, an agricultural implement used to plant seeds along a row must allow the planter row units to be laterally moved relative to each other to accommodate for various row spacings. Similarly, an agricultural implement used to harvest the crop while leaving the plant must allow the harvesting row units to be laterally moved relative to each other to accommodate for various row spacings.

In cotton fields, row spacings between adjacent rows of cotton plants may vary between about thirty and about forty inches. A typical cotton harvester includes between two and five harvesting row units mounted on a tool bar assembly at a forward end of the harvester. As will be appreciated, harvesting five rows of cotton wherein adjacent plant rows are spaced about forty inches apart or in a skip row pattern requires a tool bar assembly which is substantially wider than that required for harvesting two, three, or four narrowly spaced rows planted in a solid planting pattern.

Whether it be for cotton harvesters, planters, or other forms of agricultural implements, providing a single tool bar assembly for accommodating all the numerous combinations of row spacings and harvesting capacities is impractical because the distance between the ends of such tool bar would be too wide for conveniently transporting the agricultural implement from field to field. In view of today's economics, a farmer wanting a tool bar assembly for mounting two or three row units does not want the added cost, weight, and inconvenience of a tool bar which is wider than that required.

Having separate one-piece tool bar assemblies adaptable for two, three, or four row units results in increased manufacturing cost, area distribution costs, and inhibits a farmer from subsequently increasing the row unit capacity of his agricultural equipment unless he buys a wider tool bar. In addition to problems incurred in their manufacture, wider tool bar assemblies present problems in that they are difficult to ship from one location to another and are inconvenient to handle.

Recent advancements, particularly in the field of cotton harvesters, allow the harvesting row units to be laterally moved relative to each other to facilitate inspection and/or servicing of the row units. As will be appreciated, lateral movement of the row units relative to each other further elongates the design of the tool bar assembly on which the row units are mounted thereby further complicating the problem of providing a single length tool bar assembly for a particular model of agricultural equipment.

Thus, there is a need and a desire for a row unit mounting apparatus which can be customized to the particular agricultural implement with which it finds utility.

SUMMARY OF THE INVENTION

In view of the above, and in accordance with this invention, there is provided an apparatus for mounting a row unit for lateral movement relative to a fore-and-aft chassis of an agricultural implement. The row unit mounting apparatus includes a laterally extending tool bar assembly supported on the chassis and including a main frame and an extension frame which combine to define a continuous support surface extending between opposite ends of the tool bar assembly. The row unit is supported on the tool bar assembly in a manner allowing sliding movement of the row unit along the support surface thereof. The extension frame is selectively attachable to a first end of the main frame for easily and conveniently extending the tool bar assembly to provide additional row unit capacity or to accommodate lateral movement of the row units in a manner facilitating inspection and servicing thereof. The extension frame is selectively attached to the main frame with a guide mechanism configured to laterally extend from the main frame and fit within the extension frame for aligning the frames relative to each other to define the continuous support surface and permitting the row unit to slide therealong and beyond the first end of the main frame. The mechanism for supporting the row unit on the frame for lateral movement includes a bracket which embraces the support surface of the tool bar assembly and further includes anti-friction surfaces for facilitating lateral sliding movement of a row unit therealong. To add strength and rigidity, each frame of the tool bar assembly is preferably comprised of a pair of vertically attached and laterally elongated tubes.

The mechanism used to selectively attach the extension and main frames preferably includes an apertured guide adapted to align the frames relative to each other and fastening means for drawing and attaching the frames to each other. In a preferred form of the invention, at least the first end of the main frame has a hollow interior configuration which accommodates a portion of such guide. The fastening means extend from the main frame through the guide so as to be removed from the support surface on the tool bar assembly and do not interfere with lateral sliding movement of the row units therealong.

To align the main and extension frames, the guide fits tightly within the hollow interiors thereof. In this regard, the row unit mounting apparatus of the present invention further includes a device for facilitating disassembly of the guide from either the extension or main frame upon disassembly of the row unit mounting apparatus.

The ability to readily add an extension to the main frame of the row mounting apparatus makes it easy and convenient to accommodate numerous combinations of crop row spacings and allow the row units to be laterally moved relative to each other to facilitate servicing and inspection of same. As will be appreciated, the main frame of the row unit mounting apparatus has a relatively convenient transport width which can be easily and conveniently extended by adding extensions thereto to provide additional row capacity or to accommodate lateral movement of the row units. The ability to add extensions to the main frame improves the shipping configuration of the agricultural implement with which the row unit mounting apparatus is associated. As will be appreciated, production costs are lessened since modular unit extensions can be added to the main frame to facilitate mounting of row units in various row configurations. The use of a guide facilitates alignment of the extension and main frames and provides sufficient strength to the extension to support and allow a row unit to laterally move beyond the end of the main frame.

Numerous other features and advantages of the present invention will become readily apparent from the following detailed description, the accompanying drawings, and the appended claims.

BRIEF DESCRIPTION OF THE DRAWINGS

FIG. 1 is a plan view of an agricultural implement, such as a cotton harvester, incorporating a row unit mounting apparatus according to the present invention;

FIG. 2 is a plan view of a harvesting row unit;

FIG. 3 is a fragmentary side view of the agricultural implement illustrated in FIG. 1;

FIG. 4 is an enlarged fragmentary side view of the apparatus of the present invention;

FIG. 5 is an enlarged and fragmentary rear elevational view of the row unit mounting apparatus including a main frame and an extension frame arranged in disassembled relationship relative to each other; and FIG. 6 is a view similar to FIG. 5 showing the main frame and extension frame in assembled relation relative to each other.

DETAILED DESCRIPTION OF THE PRESENT INVENTION

While the present invention is susceptible of embodiments in various forms, there is shown in the drawings a presently preferred embodiment hereinafter described with the understanding that the present disclosure is to be considered as an exemplification of the invention and is not intended to limit the invention to the specific embodiment illustrated.

Referring now to the drawings, wherein like reference numerals indicate like parts throughout the several views, there is shown an agricultural implement which is depicted only fragmentarily and is seen as represented in its entirety in FIG. 1 by reference numeral 10. For purposes of this description, the agricultural implement 10 is in the form of a self-propelled cotton harvester. It will be appreciated, however, that the present invention is equally applicable to other forms of agricultural implements having row units mounted thereon for lateral movement relative to a chassis of the implement.

Cotton harvester 10 has a fore-and-aft extending frame or chassis 12 mounted on a pair of ground engaging front wheels 14. A pair of steerable rear wheels (not shown) provides the harvester with proper direction. Positioned forwardly on the chassis 12 are a plurality of individual harvesting row units 16. As illustrated, the harvesting row units are arranged side-by-side for harvesting adjacent and generally parallel rows of cotton. It should be appreciated, however, that this invention equally applies to a lesser number of row units than that illustrated.

In a preferred form of the invention, each row unit 16 is substantially similar in structure. Accordingly, a description of one row unit will suffice for an understanding of all the row units. Turning to FIG. 2, each row unit 16 includes a housing assembly 20 defining a fore-and-aft crop receiving opening or passage 22 which allows a plant row to pass therethrough. A pair of stalk lifters 24 extend from a forward end 26 of the housing 20. As will be described hereinafter, each harvesting unit 16 is preferably supported at a rear end 28 of the unit. Although considerable design effort has resulted in row units of reduced size and weight, the usage and required operation of such row units mandates a relatively large size mechanism having considerable weight.

An apparatus, indicated generally by reference numeral 30 on FIG. 1, is provided for mounting the row units 16 for lateral movement relative to the chassis 12 of the cotton harvester 10. Apparatus 30 of the present invention includes a laterally elongated tool bar assembly 32 connected to the chassis 12 of the cotton harvester and individual support structures 34 associated with and connecting each harvesting unit 16 to the tool bar assembly 32 for lateral movement along a continuous support surface extending between opposite ends of the tool bar assembly 32.

In a preferred form of the invention, a lift assembly 42 connects the row mounting apparatus 30 to the chassis 12. Lift assembly 42 preferably operates as a four bar parallelogram type linkage which is pivotally connected to and extends forward from the chassis 12 for securing the harvesting units to the harvester and for permitting vertical placement of the harvesting units between raised and lowered positions.

As illustrated in FIG. 1, lift assembly 42 includes a pair of laterally spaced upper tension arms 44 and 46 which extend generally parallel to a lower pair of laterally spaced lift arms 48 and 50. Rearward ends of the tension arms 44, 46, and lift arms 48, 50 are pivotally attached to the chassis 12 in vertically spaced alignment and for angular displacement thereof relative to the frame 12. Forward ends of tension arms 44, 46 and lift arms 48, 50 are pivotally connected in vertically spaced alignment to each other. Preferably, the tool bar assembly 32 is connected to and extends across the lift arms 48, 50. The tension arms 44, 46 have an effective length which is approximately equal to that of the lift arms 48, 50, respectively, and, therefore, the harvesting units connected thereto are maintained in a generally level attitude during field operation as they are raised and lowered relative to the chassis 12 of the agricultural implement 10.

Each support structure 34 slides over the support surface of the tool bar assembly 32 and connects a respective harvesting unit to the tool bar assembly 32 to allow independent lateral sliding movement along and between the ends thereof while concurrently inhibiting pivotal movement of the harvesting units about the elongated length of the tool bar assembly. The support structure 34 is advantageously provided toward a rear end 28 of the harvesting unit. As shown in FIG. 3, the rearward location of the support structure 34 permits each harvesting unit to hang off of and forwardly from the tool bar assembly 32 in a manner providing increased access between the units and unobstructed operator visibility to the forward end of the harvesting unit from a cab region on the agricultural implement.

Each support structure 34 is substantially identical in construction and, preferably constructed in accordance with co-assigned U.S. patent application Ser. No. 07/436,304 filed Nov. 13, 1989 and entitled "SYSTEM FOR MOUNTING AND SUPPORTING HARVESTING UNITS OF A COTTON HARVESTER." As fragmentarily illustrated in FIG. 4, each support structure 34 includes a generally horizontal extending channel-shaped bracket 52, an upstanding generally U-shaped lever arm 54, and a horizontally disposed support pin 56.

Preferably, bracket 52 and lever arm 54 are integrally formed from a weldment or casting. As illustrated in FIG. 4, bracket 52 is adapted to straddle and slide along the support surface of the tool bar assembly 32. In the illustrated embodiment, each bracket 52 includes a fore-and-aft extending leg section 58 which is preferably joined to a generally vertical leg section 60. The length of each leg section 58, 60 is substantially equal to the width of lever arm 54.

Bracket 52 further includes a laterally extending adjustable support 62. In the preferred embodiment, support 62 is substantially equal to the width of and is suitably connected to lever arm 54. As illustrated, support 62 entraps the elongated tool bar assembly 32 between it and vertical leg section 60 of bracket 52. The straddling or embracing relationship between bracket 52 and the tool bar assembly 32 permits the substantial weight of the harvesting unit connected thereto to be spread over a substantial surface area to promote lateral sliding movement of the harvesting units along the tool bar assembly while inhibiting rotational movement thereof about the longitudinal axis of the tool bar assembly.

To facilitate movement of the harvesting units relative to the tool bar assembly, relatively low friction and durable surfaces are preferably provided between confronting faces on each support structure 34 and the support surface of the tool bar assembly 32. In one form, such low friction durable surfaces may be provided by dipping, spraying, or otherwise applying a powder coating on the tool bar assembly 32. Such power coating may be of the type sold by Atochem Company of Glenrock, N.J. under the name Rilsan-Nylon II. Alternatively, a series of inserts 63, 64 and 65 are interposed between confronting surfaces on each support structure 34 and the tool bar assembly 32 for facilitating lateral movement of the harvesting unit along the length of the tool bar structure. Such inserts are preferably formed from a relatively low friction material such as a 1900 ultra-high molecular weight polyethylene material sold by Himont Company of Wilmington, Del. Such inserts could also be fabricated from brass or other suitable metals or metal alloys.

Returning to FIG. 1, the tool bar assembly 32 which slidably mounts and supports the row units 16 includes a main frame or first support 70 and an extension frame or second support 80 affixed in end-to-end relation relative to each other. In the illustrated embodiment, both the main frame 70 and extension frame 80 have tubular configurations. The main frame has first and second ends 71 and 72, respectively.

To extend the width of the main frame 70, extension frame 80 is selectively secured to the first end 71 of main frame 70. As shown in FIG. 5, an attaching mechanism 90 selectively attaches the main frame 70 and extension frame 80.

As shown in FIG. 5, the support surface on the main frame 70 is configured with generally flat faces 73, 74, and 75 extending laterally between the ends 71, 72 (FIG. 1) of the main frame 70 with support faces 73 and 75 having a generally upright or vertical orientation and which are spaced in a fore-and-aft relation relative to each other and joined by face 74 which extends in a fore-and-aft direction. When the main frame 70 is configured in other than a tube, at least the first end 71 thereof will have a hollow interior configuration 76.

The support surface on the extension frame 80 is configured to correspond with the main frame 70. As shown, the support surface on extension frame 80 is preferably comprised of generally flat faces 83, 84, and 85 extending laterally between the ends of the extension frame 80. Moreover, the extension frame has a hollow interior configuration 86 extending along the entire length thereof.

The attaching mechanism 90 selectively attaches the main and extension frames 70 and 80, respectively, to each other and provides sufficient strength such that a harvesting row unit can be, if necessary, supported solely by the extension frame 80. Notably, the attaching mechanism fastens the extension frame 80 to the main frame such that a continuous support surface is provided between opposite ends of the tool bar assembly.

In its present form, the attaching mechanism 90 includes a guide member 91 and fastening means 92. As will be explained in detail hereinafter, the main and extension frames 70 and 80, respectively, are drawn and, ultimately, fastened to each other through use of the fastening means 92. As shown, guide member 91 laterally extends outwardly from one end of the main frame 70. Preferably, guide member 91 is an independent and apertured structure which fits within the hollow interior configurations 76 and 86 of frames 70 and 80, respectively. The guide member 91 of this particular embodiment has a series of faces 93, 94, 95, and 96 which are adapted to fit snugly within the interior configurations of the frames 70 and 80 to facilitate alignment of the faces 73, 74, and 75 on frame 70 with faces 83, 84, and 85 on frame 80 and, thereby, facilitating sliding movement of a support structure past the joint established between the frames 70 and 80.

In the illustrated embodiment, fastening means 92 includes a pair of vertically spaced threaded studs 98 and 100 having complementary threaded nuts or members 102 and 104, respectively (FIG. 6), associated therewith. As shown, one end of each stud 98, 100 is fixedly secured and laterally extends from a block 106 suitably secured within the hollow interior configuration 76 of frame 70. Preferably, block 106 is welded about its peripheral edges to the interior surface of frame 70. The opposite end of each stud 98, 100 laterally extends beyond the first end 71 of frame 70 and laterally pass from one side through a block 108 fixedly secured to the extension frame 80. As shown, each stud 98, 100 likewise passes through the guide member 91. In the illustrated embodiment, block 108 is welded about its peripheral edges to the interior surfaces of frame 80. The nuts 102, 104 are threaded onto the free ends of studs 98, 100, respectively, and from an opposite side of the block 108.

As will be appreciated, guide member 91 is adapted to secure extension frames of different lengths to the main frame 70 to adapt the tool bar assembly 32 to a particular length suitable for a particular purpose. Initially, the guide member 91 is pressfit into the hollow interior of main frame 70 and/or the hollow interior of extension frame 80. Accordingly, upon disassembly of the tool bar assembly, the guide member 91 may remain with either frame 70 or 80. The present invention further provides an apparatus 116 for facilitating disassembly of the guide member 91 from either frame with which it is associated. As shown, apparatus 116 includes a threaded member 118 which threadably engages with a threaded bore or aperture 120 defined proximate a lateral midsection of guide member 91. After member 118 is threaded through guide member 91, one end will impact upon a fixed block within the hollow interior of the respective frame. Further turning movement of the member 118 within the guide member 91 will forcibly slide and remove the guide member 91 from within the hollow interior configuration of the associated frame.

To add strength and rigidity thereto, the main frame 70 is preferably comprised of a laterally extending first tubular section 121 and a second laterally elongated tubular section 122. The tubular sections 121, 122 are vertically disposed one on top of the other to improve the torsional handling capability of the tool bar assembly. In the illustrated embodiment, the tubular sections 121, 122 are secured to each other as by welding or the like. Similarly, extension frame 80 may be comprised of a laterally elongated first tubular section 131 and a second laterally elongated tubular section 132 vertically disposed one on top of the other and secured to each other as by welding or the like.

In the illustrated embodiment, when the frames 70 and 80 are constructed of vertically disposed sections, as shown, the attaching mechanism 90 will include an additional guide member 142 and fastening means 144 for aligning the faces of and securing the lower sections of the frames to each other. The guide member 142 and fastening means 144 may be constructed substantially similar to that discussed above and, thus, no further details need be provided therefor for a complete understanding of their structure.

In the cotton harvester embodiment shown by way of example in the drawings, the tool bar assembly 32 is connected to the frame 12 forwardly of the front wheels 14. If desired, two or three of the laterally adjustable harvesting row units 16 can be mounted on the main frame 70 of the tool bar assembly 32. Once the harvester is received by the dealer or farmer, the tool bar assembly 32 can be easily extended by adding the extension frame 80 to the main frame 70. As will be appreciated, extending the tool bar assembly 32 allows selective row spacing between the laterally adjustable harvesting units and/or increases spacing between the harvesting units to facilitate service and inspection thereof.

To extend the tool bar assembly 32, insertable guide member 91 of the attaching mechanism 90 is arranged within the hollow interiors 76 and 86 of frame 70 and 80, respectively, to facilitate alignment of the faces 73, 74, and 75 of frame 70 with faces 83, 84, and 85 of extension frame 80. Accordingly, the support structure 34 of a laterally adjustable harvesting row unit will be readily movable from the main frame 70 onto the extension frame 80. As will be appreciated, alignment between the faces of the main frame 70 and extension frame 80 reduces the amount of wear on the inserts 63, 64, and 65 of the support structure 34 as it passes over the joint between the main frame and extension frame.

During assembly of the extension frame 80 and main frame 70, the nuts 102 and 104 of the fastening means 92 are threaded onto studs 98 and 100, respectively, and can be used for drawing the extension frame 80 toward the main frame 70. As will be appreciated, the fastening means 92 maintain the extension frame 80 and main frame 70 in aligned relationship with each other. Upon disassembly of the extension frame, apparatus 116 may be used to release the guide member 91 from association with the respective frames such that it may be otherwise used to align and releasably secure other frames to each other.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An apparatus for mounting a row unit for lateral sliding movement along a generally straight line path and relative to a fore-and-aft extending chassis of an agricultural implement, said row unit mounting apparatus comprising:

a first support structure carried on said chassis in a generally horizontal disposition, said support structure having first and second ends with a support surface extending therebetween, wherein at least the first end of said support structure has a hollow interior configuration;

means for supporting the row unit for lateral sliding movement between the ends of said support structure, said supporting means including a bracket carried by said row unit and slidably embracing the support surface on said support structure;

a second support structure selectively attachable to the first end of said first support structure, said second support structure having a hollow interior configuration and a support surface corresponding to the support surface of said first support structure; and means for selectively attaching said support structures to each other, said attaching means including a guide which fits within and is secured to abutting ends of said first and second support structure to align the support surfaces therein relative to each other to define a continuous support surface.

2. The row unit mounting apparatus according to claim 1 wherein said support surface on said first support structure has a cross-sectional configuration including at least one generally upright fore-and-aft extending face.

3. The row unit mounting apparatus according to claim 1 wherein said attaching means includes fastening means extending laterally through said guide for drawing said first and second support structures into abutting and secured relationship relative to each other.

4. The row unit mounting apparatus according to claim 1 further including means threadable within said guide to facilitate removal of said guide from the interior configuration of a support structure upon disassembly of said mounting apparatus.

5. An apparatus for mounting a row unit for lateral movement relative to a fore-and-aft chassis of an agricultural implement, said row unit mounting apparatus comprising:

a laterally elongated tool bar assembly connected to said chassis and defining a continuous support surface between opposite ends thereof, said tool bar assembly including a main frame and an extension frame affixed in end-to-end relation relative to each other;

means for supporting the row unit on said tool bar assembly and allowing for lateral sliding movement along the support surface thereof; and means for selectively attaching said extension frame and said main frame to each other, said attaching means including means for aligning said frames relative to each other to define said continuous support surface of said tool bar assembly thereby permitting said row unit support means to slide therealong and beyond the first end of said main frame.

6. The row unit mounting apparatus according to claim 5 wherein said attaching means includes fastening means for affixing said frames in aligned relation relative to each other.

7. The row unit mounting apparatus according to claim 5 wherein said aligning means includes guide means removed from said continuous support surface and extending between said frames for aligning said frames in end-to-end relation.

8. The row unit mounting apparatus according to claim 7 wherein said guide means includes a guide press fit between and into hollow interiors of said main and extension frames.

9. An apparatus for mounting a series of harvesting row units on a chassis of a cotton harvester movable over a field of cotton planted in parallel rows, wherein the spacing between rows may vary from field to field, said apparatus comprising:

a laterally extending main frame supported on said cotton harvester chassis, said main frame having first and second ends and a support surface extending laterally between said ends, and wherein at least said first end of said main frame has a hollow configuration;

means for individually supporting the harvester row units on said main frame and for allowing lateral sliding movement of each harvesting row unit along the support surface to adjust the lateral spacing relative to an adjacent harvesting unit;

an extension frame selectively attachable to and removable from the first end of said main frame and having a support surface corresponding in configuration to said support surface on said main frame, and wherein said extension has a hollow interior configuration; and means for selectively attaching said extension frame to said main frame, said attaching means including guide means configured to slidably fit within said hollow interior of said main frame and extension frame for aligning said support surfaces relative to each other to define a continuous support surface permitting at least one of the harvester row units to be adjusted laterally outward beyond the first end of said main frame and slidably received onto said extension frame.

10. The harvesting row unit mounting apparatus according to claim 9 wherein said main frame is comprised of a pair of vertically attached and laterally elongated tubes, each of which defines at least one face forming part of the support surface allowing a harvesting row unit to be laterally slid therealong.

11. The harvesting row unit mounting apparatus according to claim 9 wherein each of said individual support means includes a bracket which embraces the support surface of said mounting apparatus and further includes anti-friction surfaces between said bracket and said support surface for facilitating lateral sliding movement of a harvesting unit therealong.

12. The harvesting row unit mounting apparatus according to claim 9 wherein said attaching means comprises a plurality of laterally extending studs passing through said guide means and secured at opposite ends to said main and extension frame.

13. The harvesting row unit mounting apparatus according to claim 9 further including manually operated means for forcibly removing said guide means from either said extension frame or said main frame upon disassembly of said frame.

* * * * *